(12) United States Patent
Preijert et al.

(10) Patent No.: US 8,967,645 B2
(45) Date of Patent: Mar. 3, 2015

(54) FRONT LEAF SPRING

(75) Inventors: Stefan Preijert, Göteborg (SE); Andreas Gustavsson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/367,919

(22) PCT Filed: Dec. 22, 2011

(86) PCT No.: PCT/SE2011/000240
§ 371 (c)(1),
(2), (4) Date: Jul. 15, 2014

(87) PCT Pub. No.: WO2013/095206
PCT Pub. Date: Jun. 27, 2013

(65) Prior Publication Data
US 2014/0367939 A1   Dec. 18, 2014

(51) Int. Cl.
*B60G 3/10*   (2006.01)
(52) U.S. Cl.
USPC ......... 280/124.111; 280/124.17; 280/124.174
(58) Field of Classification Search
USPC ...................... 280/124.111, 124.17, 124.174, 280/124.175, 124.163; 267/260, 269, 270, 267/271
See application file for complete search history.

(56) References Cited

U.S. PATENT DOCUMENTS

| | | | |
|---|---|---|---|
| 3,685,812 A | 8/1972 | Buchesky et al. | |
| 4,718,693 A * | 1/1988 | Booher | 280/124.107 |
| 4,919,449 A | 4/1990 | Toms | |
| 6,129,369 A * | 10/2000 | Dudding | 280/124.175 |
| 6,485,040 B1 * | 11/2002 | Dudding | 280/124.175 |
| 7,229,088 B2 * | 6/2007 | Dudding et al. | 280/124.17 |
| 2004/0080135 A1 * | 4/2004 | Dudding et al. | 280/124.163 |
| 2005/0189734 A1 * | 9/2005 | Dudding et al. | 280/124.17 |
| 2010/0038877 A1 | 2/2010 | Cortez et al. | |

FOREIGN PATENT DOCUMENTS

| | | |
|---|---|---|
| WO | 9003281 A1 | 4/1990 |
| WO | 9929526 A1 | 6/1999 |

OTHER PUBLICATIONS

International Search Report (Sep. 10, 2012) for corresponding International App. PCT/SE2011/000240.
International Preliminary Report on Patentability (Feb. 6, 2014) for corresponding International App. PCT/SE2011/000240.

* cited by examiner

*Primary Examiner* — Faye M. Fleming
(74) *Attorney, Agent, or Firm* — WRB-IP LLP (57) ABSTRACT

A vehicle suspension includes a pair of leaf springs arranged to extend longitudinally on opposed sides of a vehicle frame. Each leaf spring has a first end pivotally connected to the vehicle with a first bracket attached rigidly to the frame at a first position. A second end is connected to the vehicle frame with a spring shackle pivotably connected to a second bracket attached rigidly to the frame at a second position, in order to compensate for length changes of the leaf spring under load conditions. The suspension further includes an axle extending transversely of the vehicle frame which axle is mounted to each leaf spring at a position intermediate its first and second ends. At least an upper leaf of the leaf spring is a parabolic spring having a convex portion extending towards the frame, and the convex portion is located between the first end and the intermediate position.

10 Claims, 8 Drawing Sheets

FRONT LEAF SPRING

BACKGROUND AND SUMMARY

This invention relates to a vehicle suspension comprising leaf springs, in particular a suspension for a rigid axle with improved roll steer behaviour.

In vehicle suspensions where a rigid axle is located and controlled by leaf springs, many compromises have to be made. Such compromises can adversely reflect on the suspension performance under various loading conditions to which it is subjected during the operation of the vehicle. Examples of such loading condition is vehicle roll about the longitudinal roll centre which occurs when the vehicle is negotiating a bend or is subjected to forces induced by strong winds in the transverse direction. A further loading is termed "bump steer", which occurs when a wheel on one side of the vehicle is deflected upwards by an obstacle on the road surface. This type of loading affects the roll steer behaviour of the vehicle and the effect can be reduced by improving the auxiliary roll stiffness component of the suspension. The effect of spring stiffness on roll motion is combined with auxiliary roll stiffness to give the total roll stiffness. The auxiliary roll stiffness is a component of the total roll stiffness derived from suspension components other than the springs themselves (trailing arm systems, anti-roll bars, etc.).

Some attempts to increase the auxiliary roll stiffness component have been made previous to the invention described below. Vehicle manufacturers have achieved limited success by increasing the longitudinal asymmetry of the spacing of the axle upon the springs. Specifically, by locating the axle at a point between of the midpoint of the leaf springs and their direct connection to the vehicle frame via the spring hanger, and by increasing the torsional stiffness of the axle, approximately ten percent gains have been made in the auxiliary roll stiffness component. This is due to a correlating increase in both of the two subcomponents of the auxiliary roll stiffness component, leaf twist and axle torsion.

The increase in the leaf twist subcomponent can be visualized as follows. As the vehicle negotiates a change in direction, the springs are loaded asymmetrically in the lateral direction. As a result the vehicle body leans. This produces an angularity between the axle and the vehicle frame in the lateral direction, with the outer spring compressed to a greater extent, and the inner spring relieved to some extent. The springs become the compliant member which accepts this angular difference. That is, they are twisted slightly along their length. Because the leaf springs are affixed to the chassis at their extremities, the twist occurs between the front spring eye and the mid-point axle attachment, and between the rear spring eye and the midpoint axle attachment. The ability of each spring half-portion of the overall length to resist this twist is a function of the shear modulus of the material, its polar moment of inertia, and the length of that half-portion. Because the torsional spring rate of the spring half-portion of the overall length is a function of the inverse of the length of that half-portion, the rate at which the torsional spring rate increases for the spring half-portion which is made shorter by longitudinal asymmetry becomes rapidly greater than the rate at which the torsional spring rate decreases for the spring half-portion which is made longer by that same longitudinal asymmetry. Because the direct connection between the spring and the vehicle frame via the spring hanger is generally more rigid than the connection via the spring shackle, or the member which compensates for the variation of the spring length upon deflection, that is generally the end of the spring toward which the axle is located.

The increase in the axle torsion subcomponent of auxiliary roll stiffness can be visualized as follows. As the vehicle leans, the outer spring is compressed to a greater extent, and the inner spring is relieved to some extent, as mentioned previously. As a leaf spring is compressed, it generally flattens in the case of a parabolic spring, or becomes invertedly parabolic in the case of a flat spring. It also changes in distance between the spring eyes, which explains the need for the spring shackle mentioned previously. At some point at or near its mid-point, a tangent drawn to the spring at that point remains at a fairly constant angle relative to the longitudinal axis of the vehicle throughout deflection of the spring. Forward and rearward of that theoretical midpoint, the angle between a tangent drawn to the spring and the longitudinal axis of the vehicle will change throughout deflection of the spring. By attaching the axle to a point other than that theoretical midpoint, generally in the direction from the theoretical midpoint toward the direct connection between the spring and the vehicle frame via the spring hanger, torsion is introduced to the axle, due to the fact that the inner and outer springs are deflecting in opposite directions resulting in opposite changes in the angularity between the tangents drawn to the springs and the longitudinal axis of the vehicle. By also increasing the torsional rigidity of the axle, the axle torsion subcomponent of auxiliary roll stiffness is increased.

Figure 1A:
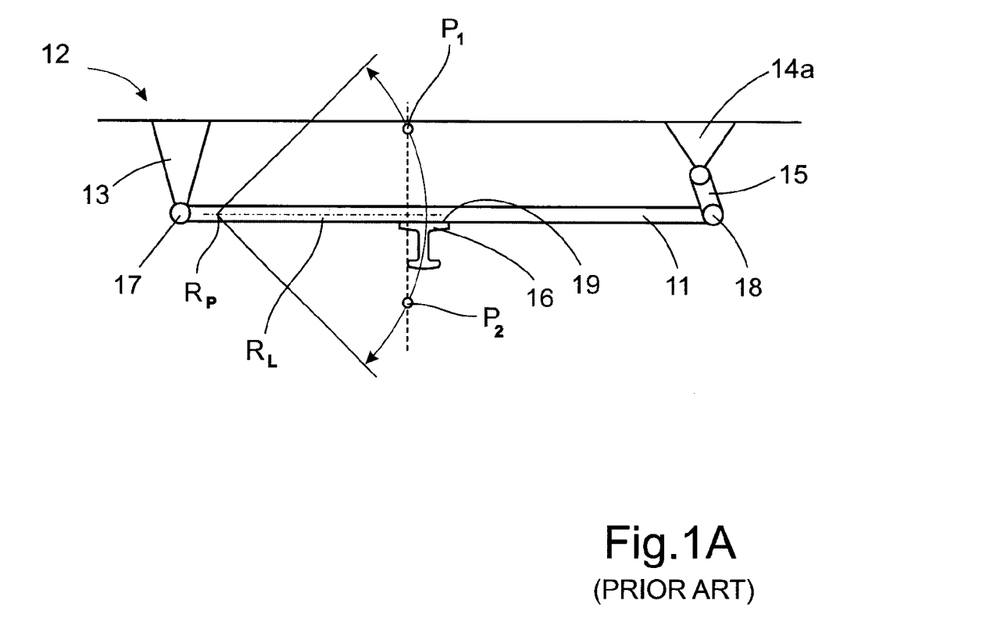
FIG. 1a-b show a schematic side view of a pair of alternative prior art front wheel suspensions.
Figure 1B:
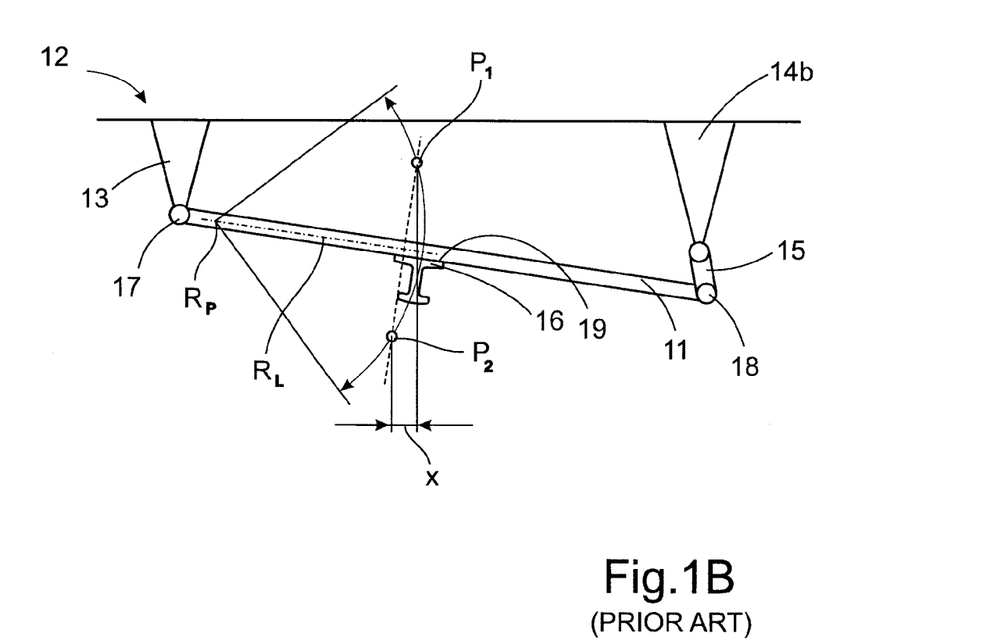

An example of a conventional vehicle suspension arrangement is shown in FIGS. 1a and 1b, which show a schematic side view of a pair of prior art front wheel suspensions. In these figures the same reference numbers will be used for denoting the same component parts. The vehicle suspension in FIG. 1a comprises a pair of leaf springs 11 (one shown) arranged to extend longitudinally on opposed sides of a vehicle frame 12. Each leaf spring has a first end pivotally connected to the vehicle with a first bracket or spring hanger 13 attached rigidly to each leaf spring frame at a first position. A second end of the leaf spring is connected to the vehicle frame with second bracket or spring hanger 14a and a spring shackle 15, in order to compensate for length changes of the leaf spring under load conditions. A rigid axle 16 extends transversely of the vehicle frame, which axle is mounted to each leaf spring by means of a further bracket at a position between the respective first and second ends. The axle 16 is provided with an axle plate 19 which rests against the leaf spring 11. The leaf spring 11 is attached to the respective spring hanger 13, 14a at a front and a rear leaf spring end eye 17, 18, respectively. In this example the axle is a front steering axle A damper means (not shown) such as an air spring is mounted between the axle and the vehicle frame at or adjacent the axle.

FIG. 1a shows a leaf spring arrangement for a normal steered vehicle, having negligible axle steer. As the leaf spring 11 is deflected under load a point P, located at the centre of the axle plate 19 and intersected by a normal plane through the axle plate at this point, will follow an arc determined by the location of the so-called Ross point Rp. As the load on the spring is increased and decreased, said point P will move between an upper point P1 and a lower point P2. As can be seen from FIG. 1a, an imaginary line through the upper and lower points P1, P2 is substantially vertical, resulting in a neutral steered suspension with virtually no axle steer.

For steered rigid axles the normal design is to create an understeer behaviour, which requires a relatively large rearward inclination for both the Ross line and the datum line. The datum line is an imaginary reference line between the front and rear leaf spring end eyes. An example of this is shown in FIG. 1b, in which the vehicle suspension comprises a pair of leaf springs 11 arranged to extend longitudinally on opposed sides of a vehicle frame 12. Each leaf spring has a first end pivotally connected to the vehicle with a first bracket or spring hanger 13 attached rigidly to each leaf spring frame at a first position. A second end of the leaf spring is connected to the vehicle frame with an extended spring hanger 14b and a spring shackle 15. A rigid axle 16 extends transversely of the vehicle frame, which axle is mounted to each leaf spring by means of a further bracket at a position between the respective first and second ends. The axle 16 is provided with an axle plate 19 which rests against the leaf spring 11. The leaf spring 11 is attached to the respective spring hanger 13, 14b at a front and a rear leaf spring end eye 17, 18, respectively. The extended spring hanger 14b causes the required rearward inclination for both the Ross line and the datum line.

The datum line is an imaginary reference line between the front and rear leaf spring end eyes 17, 18. It is generally known in the art that leaf springs under load will arc about at imaginary point in space which is called the "Ross point" which in turn determines the so-called "Ross line". The Ross point is indicated at Rp and the Ross line is indicated at RL the FIGS. 1a and 1b. It is further known that the Ross line should be as flat and long as possible and the Ross line geometry should match the drag link geometry of the vehicle steering linkage (not shown). The drag link connects the pitman arm and the idler arm in a conventional steering linkage.

FIG. 1b shows a leaf spring arrangement for an understeered vehicle, with axle steer. As the leaf spring 11 is deflected under load a point P will follow an arc determined by the location of the Ross point Rp as described above. As the load on the spring is increased and decreased, said point P will move between an upper point Pi and a lower point P2. As can be seen from FIG. 1b, an imaginary line through the upper and lower points P1, P2 is angled in an upwards and rearwards direction. The arrangement of the leaf spring 11 in FIG. 1b causes a longitudinal difference x between vertical lines through the upper and lower points P1, P2, resulting in an understeered suspension with axle steer in the X-Y plane. In the subsequent text, the x-axis is located in the longitudinal direction of the vehicle, the y-axis is located in the transverse direction of the vehicle and the z-axis is in the vertical direction, at right angles to the X-Y plane.

Figure 2:
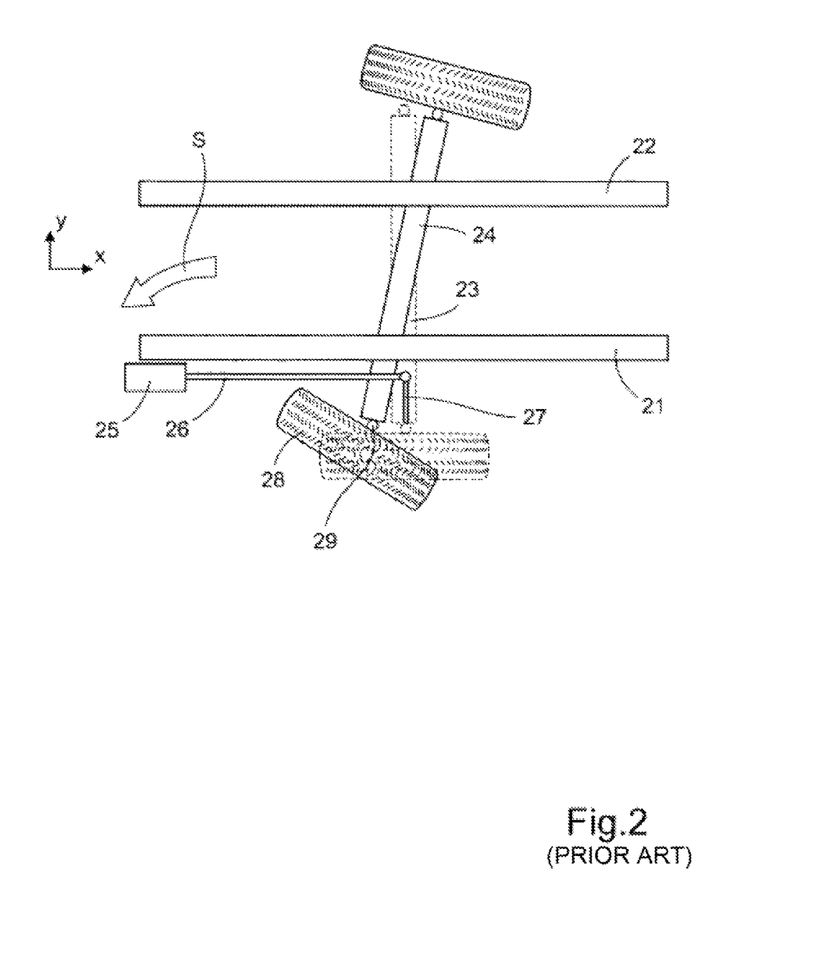
FIG. 2 shows a schematic plan view of the front wheel suspension in FIG. 1b.

The Ross line and datum line angle in FIG. 1b will result in an axle steer, which causes an axle rotation in the z-direction, as indicated in FIG. 2. FIG. 2 shows a schematic plan view of the suspension indicated in FIG. 1b. FIG. 2 shows a left and right leaf spring 21, 22, which are connected by a rigid steered axle 23, corresponding to the axle 11 in FIG. 1b in its loaded position. The figure also shows the steered axle 23, indicated in dashed lines, in the position when the load on the spring is decreased, and the near side of the axle 23 is at the lower point P2. This loading situation occurs when a driver steering input in the steering direction S causes the vehicle to roll to the right during a left hand turn. The figure also shows a steering box 25 which has a pitman arm (not shown) connected to a steering rod 26 and a spindle arm 27 for controlling the steerable wheel 28. The steering box 25 is attached to the frame, which has been left out for clarity. During a left hand turn the load on the spring will cause the axle to be displaced from the position indicated by the axle 23 to the position indicated by the axle 24, resulting in a displacement of the wheel centre 29. As the position of the steering rod 26 is controlled by the steering box 25, which is fixed, the displacement of the wheel centre 29 will cause a rotation of the wheel 28 in a direction contrary the steering input, resulting in understeer.

However, in order to achieve this axle steer the rear spring bracket 14b requires high stiffness due to the relatively large vertical offset from the chassis frame. Such an arrangement is space consuming, heavy and expensive.

The design described above, with a rearward angled leaf spring and with the Ross and datum lines close to parallel, will give very little longitudinal motion in the direction of the datum line. This reduces the forces in the spring and axle system so that the axle steer will have a direct understeer influence on the total steering behaviour. In this context, the total steering is the combined steering effect created by driver steering input, understeer and roll steer. When the steering rod moves the spindle arm in a longitudinal direction, the axle steer will cause an understeer effect during a roll motion of the vehicle frame.

Figure 3:
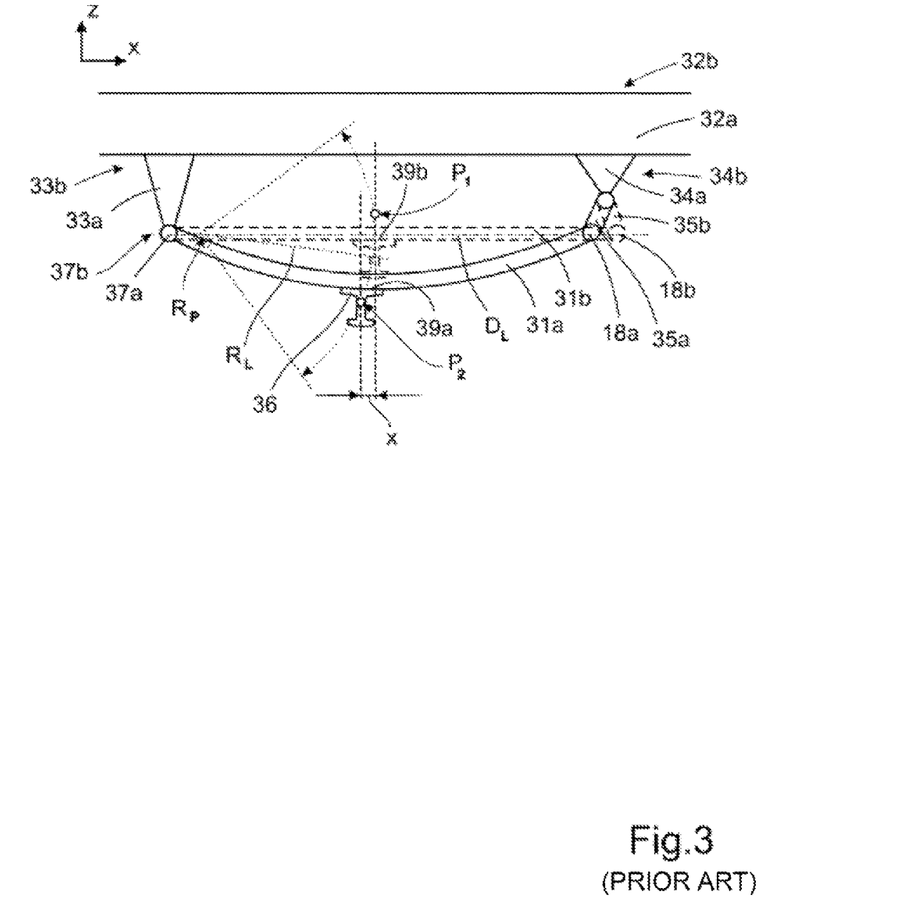
FIG. 3 shows a schematic side view of a further prior art front wheel suspension.

FIG. 3 shows a side view of an alternative prior art vehicle suspension where the angle between the Ross line RL and the datum line DL is large enough to achieve a desired axle steer behaviour. The prior art vehicle suspension in FIG. 3 comprises a pair of left and right leaf springs 31a, 31b arranged to extend longitudinally on opposed sides of a vehicle frame 32a, 32b. Each leaf spring has a first end pivotally connected to the vehicle with a first bracket or spring hanger 33a, 33b attached rigidly to each leaf spring frame at a first position. A second end of the leaf spring is connected to the vehicle frame with second bracket or spring hanger 34a, 34b and a spring shackle 35a, 35b, in order to compensate for length changes of the leaf spring under load conditions. A rigid axle 36 extends transversely of the vehicle frame, which axle is mounted to each leaf spring by means of a further bracket at a position between the respective first and second ends. The axle 36 is provided with an axle plate 39a, 39b which rests against the respective leaf spring 31a, 31b. The leaf springs 31a, 31b is attached to the respective spring hanger 33a, 33b; 34a, 34b at a front and a rear leaf spring end eye 17a, 17b; 18a, 18b, respectively.

Figure 4:
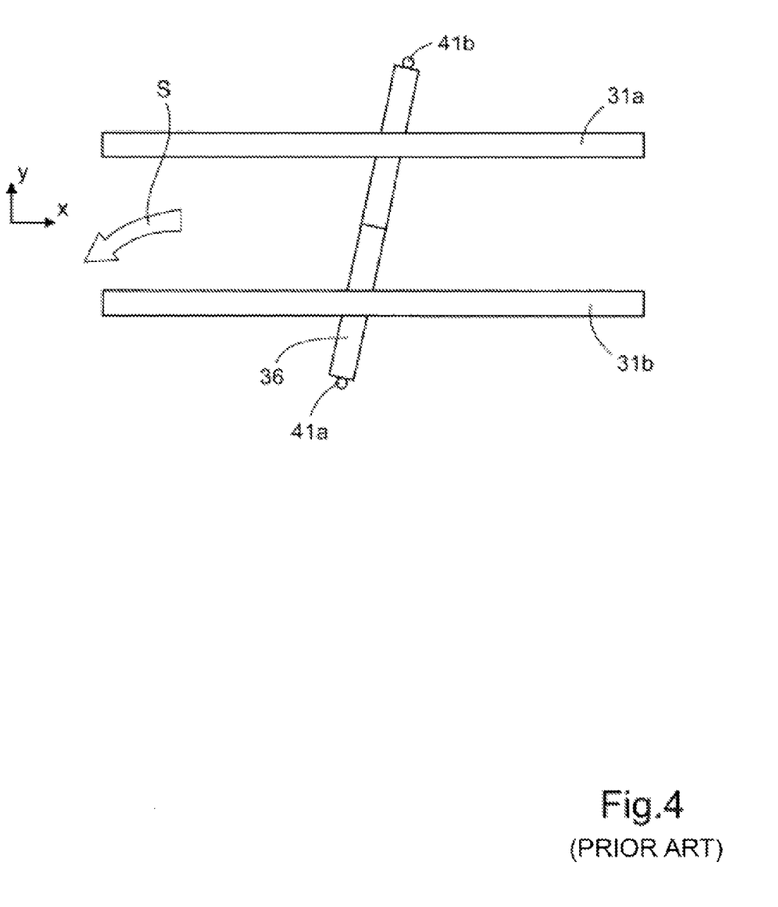
FIG. 4 shows a schematic plan view of a desired axle position for the suspension in FIG. 3.

The steered axle 36, indicated in FIG. 4, corresponds to the axle position when the load on the left hand spring is decreased, and the end of the axle 36 at the near side is at the lower point P2. Similarly, the end of the axle 36 at the far side is at the upper point Pi. This loading situation occurs when a driver steeling input in the steering direction S causes the vehicle to roll to the right during a left hand turn.

Figure 5:
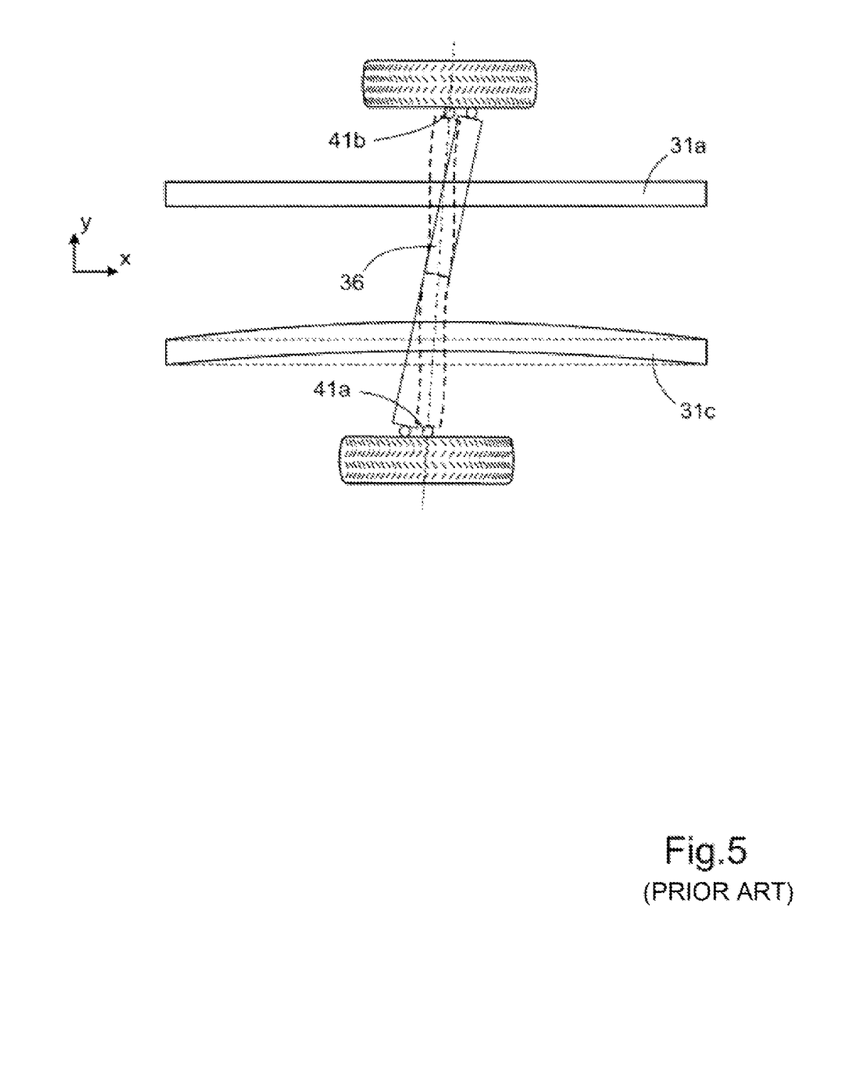
FIG. 5 shows a schematic plan view of the actual axle position for the suspension in FIG. 3.

When the angle between the Ross line RL and the datum line DL is large enough to achieve a desired axle steer behaviour due to the displacement of the wheel centres 41a, 41b, as indicated by a schematically indicated axle position in FIG. 4. However, the result will be large reaction forces between the two leaf springs 11a, 11b. This will cause a twisting deformation of the axle 36 and the leaf springs 11a, 11b, as schematically indicated in FIG. 5. The deformation of the axle 36 will displace the wheel centres 41a, 41b in a way that reduces the desired understeer effect on the total steering. FIG. 5 shows the actual position of the axle 36 as well as the desired position of the axle (dashed lines) from FIG. 4.

The solution according to the invention aims to provide an improved leaf spring arrangement that overcomes the above problems.

DISCLOSURE OF INVENTION

According to an aspect of the present invention, a parabolic leaf spring is provided.

In the subsequent text, the vehicle referred to is a commercial type vehicle comprising a frame built up of a pair of substantially parallel beams, for instance beams with an I- or C-shaped cross-section. The suspension according to the invention is preferably, but not necessarily, intended for front wheel suspensions comprising steerable wheels. It should be noted that all distances referred to are taken when the vehicle is stationary and the suspension is in a fully loaded or design state, unless otherwise specified. Additionally, the vehicle can be subjected to loafing states relating to bump, roll and brake, but these states occur when the vehicle is moving.

The invention relates to a vehicle suspension comprising a pair of leaf springs arranged to extend longitudinally on opposed sides of a vehicle frame. Each leaf spring has a first end pivotally connected to the vehicle by means of a first bracket attached rigidly to the frame at a first position. The leaf spring further comprises a second end connected to the vehicle frame with a spring shackle pivotably connected to a second bracket attached rigidly to the frame at a second position, in order to compensate for length changes of the leaf spring under load conditions. An axle is arranged to extend transversely of the vehicle frame which axle is mounted to each leaf spring at a position intermediate its first and second ends. A conventional clamping arrangement can be used for rigidly attaching the axle to each leaf spring at the intermediate position of the leaf spring. A suitable damper means is mounted between the axle and the vehicle frame. The damper can be a suitable conventional damper, such as an air spring, such as a pneumatic bellows, or a suspension strut, such as a telescopic suspension strut, but the type of damper used is not essential to the invention.

According to an aspect of the invention, at least an upper leaf of the leaf spring is a parabolic spring having a convex portion extending towards the frame, and that the convex portion is located between the first end and the intermediate position.

Consequently, the suspension can comprise a single leaf spring having such a shape along its longitudinal extension. Alternatively two or more leaf springs can be assembled to a stack of parabolic springs where each leaf spring has such a convex portion.

The convex portion is located adjacent the first end of the leaf spring, wherein the initial portion of the leaf spring pivotably attached to the first bracket is angled upwards and backwards from its attachment point towards the convex portion. The leaf spring has an inflection point between the convex portion and said intermediate position where the axle is attached.

The upper surface of convex portion of the upper leaf spring is preferably located level with or above a reference line between a first end eye at the first bracket and a second end eye at the spring shackle, when the leaf spring is in its neutral position. This reference line is also referred to as a datum line. In its unloaded state, the upper surface of the upper leaf spring at the intermediate position is located a predetermined first distance B below said reference line. At the same time the upper surface of convex portion is located a predetermined second distance C above the location of said upper surface of the leaf spring at the intermediate position, wherein the second distance C is defined as C>0.75 B. The maximum value of the distance C is of course limited by the allowable movement of the leaf spring in relation to the frame and other components mounted in the vicinity of the movable parts of the suspension. The first end eye and the intermediate position are separated by a predetermined length A in the longitudinal direction of the leaf spring, wherein the first distance B is defined as B>A/16.

The invention is also related, according to an aspect thereof, to a vehicle provided with a suspension comprising at least one leaf spring as described in the above examples.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

DETAILED DESCRIPTION

Figure 6:
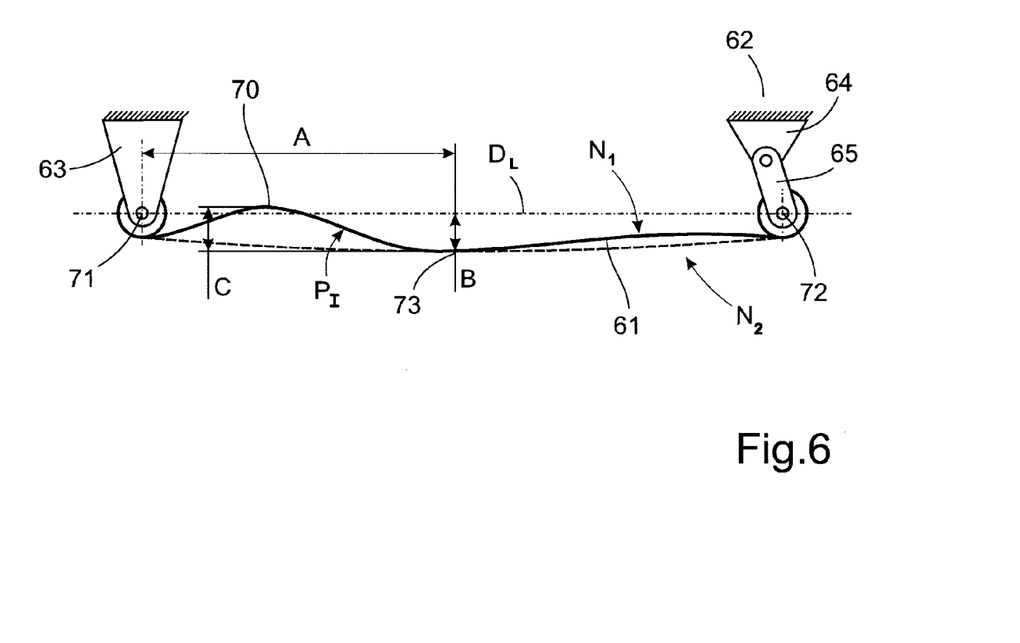
FIG. 6 shows a schematic side view of a wheel suspension with a leaf spring in its design state according to a first embodiment of the invention.

FIG. 6 shows a schematic side view of a vehicle suspension with a leaf spring according to a first embodiment of the invention. The position of the spring is shown for its design state, that is, the position of the spring when the vehicle is fully loaded.

The vehicle suspension comprises a leaf spring 61 arranged to extend longitudinally on opposed sides of a vehicle frame 62. Each leaf spring 61 has a first end 71 pivotally connected to the vehicle with a first bracket 63 attached rigidly to the frame 62 at a first position. The leaf spring limber comprises a second end 72 connected to the vehicle frame with a spring shackle 65 pivotably connected to a second bracket 64 attached rigidly to the frame at a second position, in order to compensate for length changes of the leaf spring under load conditions. An axle 66 (see FIG. 7) is arranged to extend transversely of the vehicle frame 62 which axle is mounted to each leaf spring 61 at a position 73 intermediate its first and second ends 71, 72. In the arrangement shown here, the first and second ends 71, 72 coincide with the first and second end eyes, respectively, of the leaf spring 61. Hence, the same reference number will be used for these features. A conventional clamping arrangement (not shown) is used for rigidly attaching the axle to each leaf spring at the intermediate position 73 of the leaf spring. A damper means (not shown in FIG. 7) is mounted to an upper portion of the leaf spring between the axle and the vehicle frame. The damper can be a suitable conventional damper, such as an air spring, such as a pneumatic bellows, or a suspension strut, such as a telescopic suspension strut, depending on the weight and type of vehicle.

FIG. 6 shows a single leaf spring 61, which is a parabolic spring having a convex portion 70 extending towards the frame 62. The figure shows the neutral line Ni of the leaf spring, that is, the position of the spring with the vehicle fully loaded and at a standstill. As a comparison, the neutral line N2 of a standard under bend spring is indicated in dashed lines. The convex portion 70 is located between the first end 71 and the intermediate position 73.

The convex portion 70 in FIG. 6 is located adjacent the first end 71 of the leaf spring 61, wherein the initial portion of the leaf spring pivotably attached to the first bracket 63 is angled upwards and backwards from its attachment point towards the convex portion 70. The leaf spring 61 has an inflection point Pi between the convex portion 70 and said intermediate position 73 where the axle is attached.

The upper surface of convex portion 70 of the leaf spring 61 is located level with or above a reference line DL between the first end eye 71 at the first bracket 63 and the second end eye 72 at the spring shackle 65, when the leaf spring is in its neutral position. This reference line DL is also referred to as a datum line. In its fully loaded state, the upper surface of the leaf spring 61 at the intermediate position 73 is located a predetermined first distance B below said reference line DL. At the same time the upper surface of convex portion 70 is located a predetermined second distance C above the location of said upper surface of the leaf spring 61 at the intermediate position 73, wherein the second distance C is defined as C>0.75 B. The maximum initial value of the distance C is of course limited by the allowable movement of the leaf spring in relation to the frame and other components mounted in the vicinity of the movable parts of the suspension. The first end eye 71 and the intermediate position 73 are separated by a predetermined length A in the longitudinal direction of the leaf spring 61, wherein the first distance B is defined as B>A/16. According to one non-limiting example, a parabolic leaf spring according to the invention can have a total length between the first and second end eyes 71, 72 of 1720 mm. Suitable dimensions for the various distances is A=860 mm, B=55 mm and C=70 mm. This arrangement will give a Ross angle a of 3.8°. A damper means (not shown) is mounted to an upper portion of the leaf spring between the axle and the vehicle frame. The damper can be a suitable conventional damper, such as an air spring, such as a pneumatic bellows indicated in dashed lines in the figure.

The suspension can comprise a single leaf spring having the shape described above along its longitudinal extension. Alternatively two or more such leaf springs can be assembled to a stack of parabolic springs where each leaf spring has such a convex portion.

Figure 7:
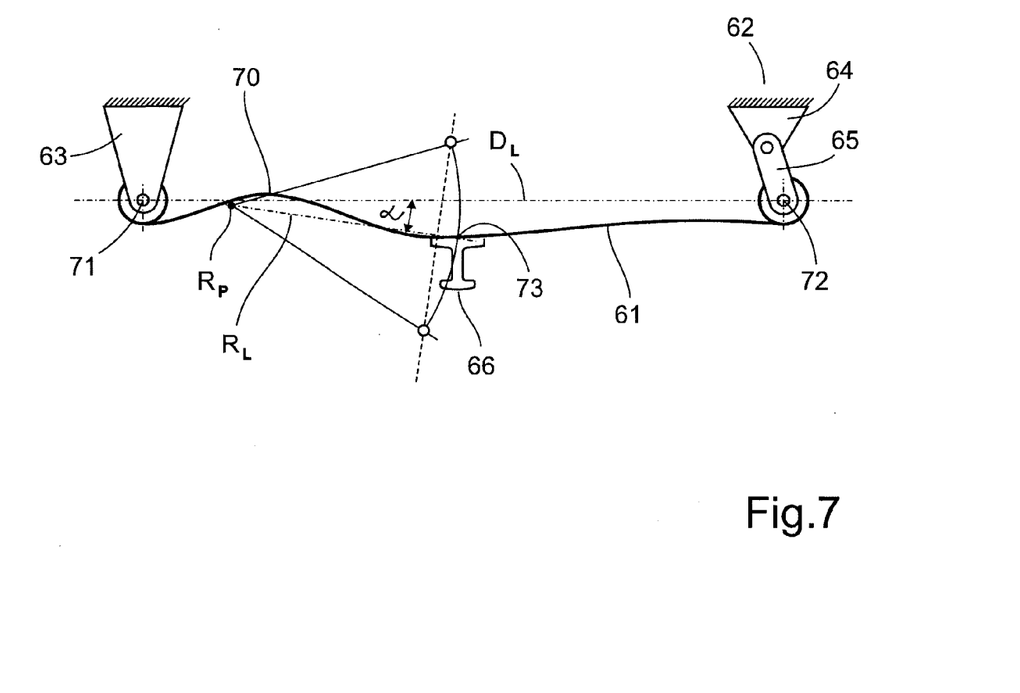
FIG. 7 shows a schematic side view of the vertical displacement of the front wheel suspension in FIG. 6 when subjected to a load.

FIG. 7 shows a schematic side view of the from wheel suspension in FIG. 6 when fully loaded. FIG. 7 shows the leaf spring 61 according to the invention which will provide a predetermined axle steer for an understeered vehicle. The Ross point is indicated at RP and the Ross line is indicated at RL in FIG. 7. The angle between the reference line DL and the Ross line RL is the Ross angle a. As the leaf spring 61 is deflected under load a point P will follow an arc determined by the location of the Ross point Rp as described above. As the load on the spring is increased and decreased, said point P will move between an upper point Pi and a lower point P2. As can be seen from FIG. 7, an imaginary line through the upper and lower points P1, P2 is angled in an upwards and rearwards direction. The arrangement of the leaf spring 61 in FIG. 7 causes a longitudinal difference x between vertical lines through the upper and lower points Pi, P2, resulting in an understeered suspension with axle steer in the X-Y plane. In the text, the x-axis is located in the longitudinal direction of the vehicle, the y-axis is located in the transverse direction of the vehicle and the z-axis is in the vertical direction, at right angles to the X-Y plane.

Figure 8:
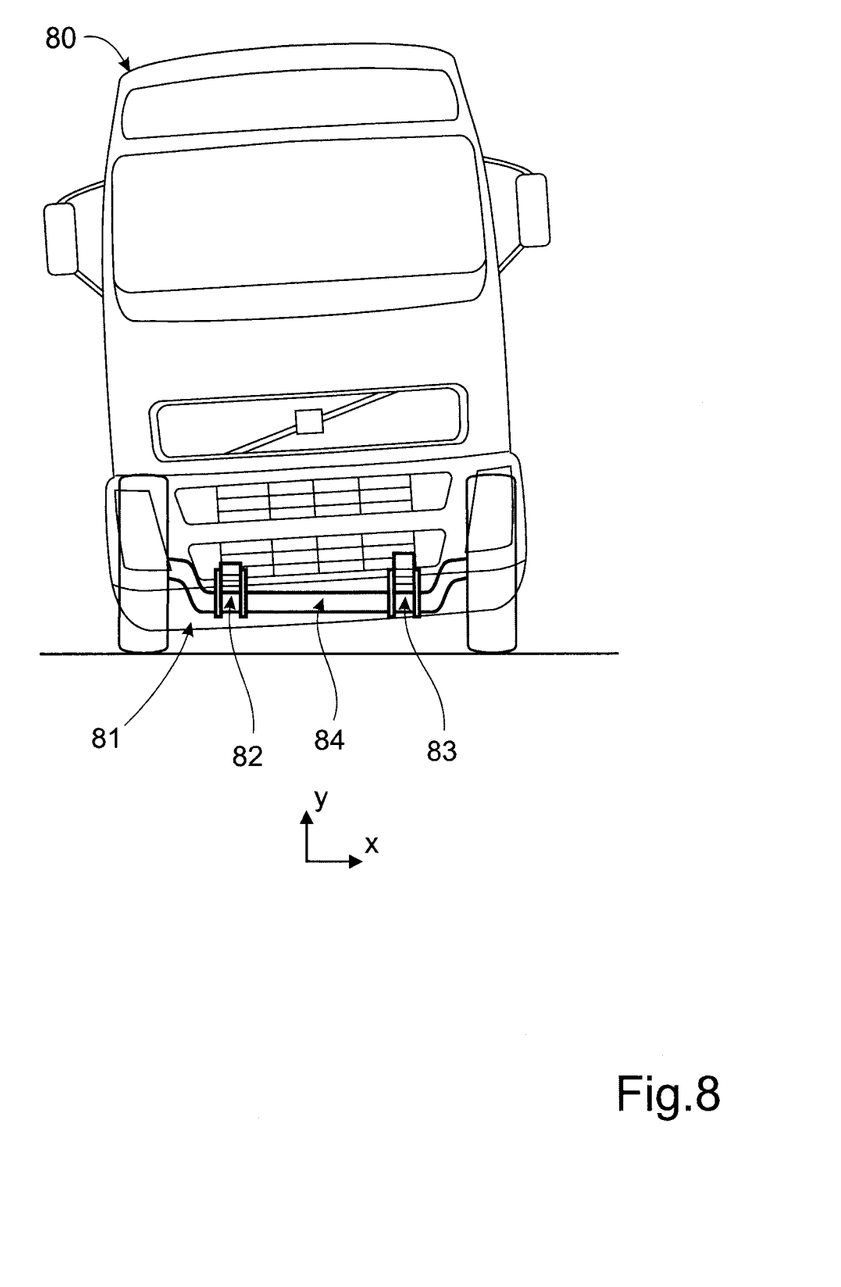
FIG. 8 shows a vehicle provided with a wheel suspension comprising leaf springs according to the invention.

FIG. 8 shows a vehicle 80 provided with a wheel suspension 81 comprising leaf springs 82, 83 according to the invention attached to a rigid axle 84. The vehicle is shown when negotiating a bend, which induces a loading state onto the leaf springs 82, 83 as the vehicle 80 is subjected to a lateral forced roll.

Figure 9:
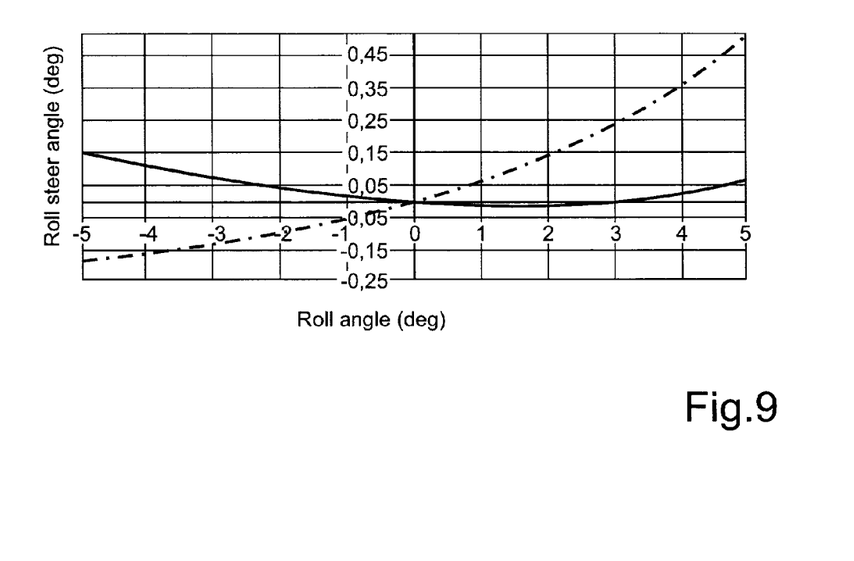
FIG. 9 shows a schematic diagram indicating, roll steer angle over roll angle for a vehicle subjected to vertical roll.

FIG. 9 shows a schematic diagram indicating roll steer angle over roll angle for a vehicle provided with leaf springs according to the invention when the vehicle is subjected to vertical roll. Vertical roll implies that the vehicle is not subjected to a side force. This type of loading is caused by so-called "bump-steer" when one of the wheels on a rigid axle is deflected upwards by an obstacle such as a ridge or a rock on the road surface. The roll steer angle in the diagram is the average roll steer angle for the left and right wheels.

As can be seen from the solid line in the diagram, even a relatively large roll angle will have a negligible effect on the roll steer angle. This can be compared to the roll steer behaviour of a conventional underbend leaf spring, as indicated by a dashed line in FIG. 9. The diagram indicates that a spring according to the invention will cause increased under-steer, which gives an improved steering feel for the driver when driving across an uneven surface.

Figure 10:
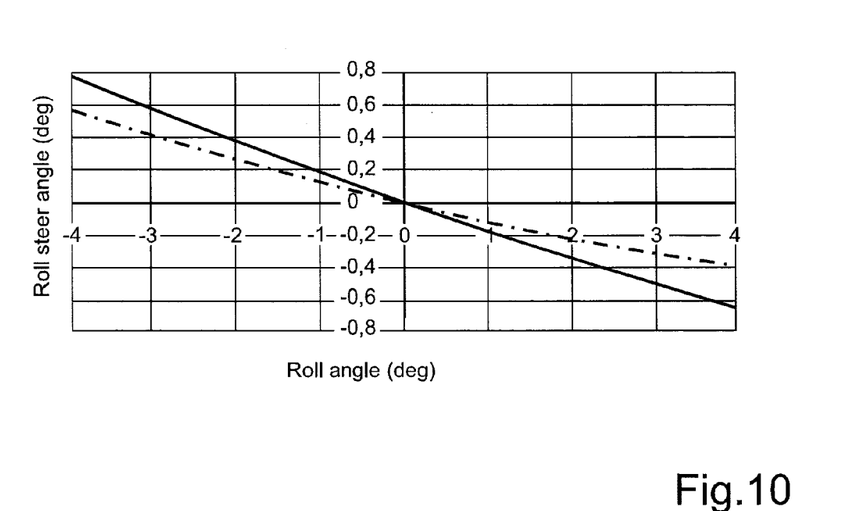
FIG. 10 shows a schematic diagram indicating roll steer angle over roll angle for a vehicle subjected to a lateral forced roll.

FIG. 10 shows a schematic diagram indicating roll steer angle over roll angle for a vehicle provided with leaf springs according to the invention when subjected to a lateral forced roll. In this case the lateral forced roll is caused by a 0.4 g side force. This type of loading is caused by the vehicle negotiating a bend.

As can be seen from the solid line in the diagram, the roll steer angle increases with an increasing roll angle. Compared to the roll steer behaviour of a conventional underbend leaf spring, as indicated by a dashed line in FIG. 8, it can be seen that the roll steer angle is improved over the entire range of roll angles. The diagram indicates that a spring according to the invention will cause an increased understeer with increasing roll angle, which is desirable for trucks and commercial vehicles provided, with leaf springs.

The invention is not limited to the above embodiments, but may be varied freely within the scope of the appended claims.

The invention claimed is:

1. A vehicle suspension comprising a pair of front leaf springs arranged to extend longitudinally on opposed sides of a vehicle frame, each front leaf spring having a first end pivotally connected to the vehicle with a first bracket attached rigidly to the frame at a first position; and a second end connected to the vehicle frame with a spring shackle pivotably connected to a second bracket attached rigidly to the frame at a second position, in order to compensate for length changes of the front leaf spring under load conditions, the suspension further comprising an axle extending transversely of the vehicle frame which axle is mounted to each front leaf spring at a position intermediate its first and second ends, and a damper means mounted between the axle and the vehicle frame, wherein at least an upper leaf of each of the front leaf springs is a parabolic spring having a convex portion extending towards the frame (62}, and that the convex portion is located between the first end and the intermediate position.

2. The suspension according to claim 1, wherein each front leaf spring comprises a stack of parabolic springs having a convex portion.

3. The suspension according to claim 1, wherein the convex portion is located adjacent the first end of the front leaf spring.

4. The suspension according to claim 1, wherein the front leaf spring has an inflection point between the convex portion and the intermediate position, 5. The suspension according to claim 1, wherein the upper surface of convex portion of the upper front leaf spring is located level with or above a reference line between a first end eye at the first bracket and a second end eye at the spring shackle, when the front leaf spring is in its neutral position.

6. The suspension according to claim 5, wherein the upper surface of the upper front leaf spring at the intermediate position is located a predetermined first distance (B) below the reference line, wherein the upper surface of convex portion is located a predetermined second distance (C) above the location of the front leaf spring at the intermediate position, wherein the second distance is defined as $C \geq 0.75\ B$.

7. The suspension according to claim 5, wherein the first end eye and the intermediate position are separated by a predetermined length (A) in the longitudinal direction of the front leaf spring, wherein the first distance (B) is defined as $B > A/16$.

8. The suspension according to claim 1, wherein the damper means is an air spring, such as a pneumatic bellows.

9. The suspension according to claim 1, wherein the damper means is a suspension strut.

10. Vehicle wherein the vehicle is provided with a suspension according to claim 1.

\* \* \* \* \*